(12) United States Patent
Sudo

(10) Patent No.: US 9,010,649 B2
(45) Date of Patent: Apr. 21, 2015

(54) IC CARD, PORTABLE ELECTRONIC DEVICE, AND READER/WRITER

(71) Applicant: Kabushiki Kaisha Toshiba, Tokyo (JP)

(72) Inventor: Kiyohito Sudo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/031,248

(22) Filed: Sep. 19, 2013

(65) Prior Publication Data

US 2014/0084062 A1 Mar. 27, 2014

(30) Foreign Application Priority Data

Sep. 21, 2012 (JP) ................................. 2012-207797

(51) Int. Cl.
| | |
|---|---|
| G06K 19/00 | (2006.01) |
| G06K 19/073 | (2006.01) |
| G06K 7/00 | (2006.01) |
| G06K 19/07 | (2006.01) |
| H04B 5/00 | (2006.01) |
| G06K 7/10 | (2006.01) |
| H02J 7/00 | (2006.01) |

(52) U.S. Cl.
CPC ............ *G06K 19/073* (2013.01); *G06K 7/0008* (2013.01); *G06K 19/0702* (2013.01); *G06K 7/10009* (2013.01); *G06K 19/0723* (2013.01); *G06K 19/0708* (2013.01); *G06K 7/10207* (2013.01); *G06K 7/10237* (2013.01); *G06K 19/0701* (2013.01); *G06K 19/0707* (2013.01); *G06K 19/0709* (2013.01); *H02J 7/00* (2013.01); *H04B 5/0037* (2013.01); *H04B 5/0056* (2013.01)

(58) Field of Classification Search
USPC .............................. 235/487, 492; 340/10, 572
See application file for complete search history.

(56) References Cited

U.S. PATENT DOCUMENTS

| | | | |
|---|---|---|---|
| 2008/0237355 A1* | 10/2008 | Ahn et al. ..................... | 235/492 |
| 2010/0217723 A1* | 8/2010 | Sauerwein et al. ........... | 705/337 |
| 2011/0018490 A1* | 1/2011 | Furuya et al. ................. | 320/101 |

FOREIGN PATENT DOCUMENTS

| | | |
|---|---|---|
| JP | 2006287536 | 10/2006 |
| KR | 10-2011-0036436 A | 4/2011 |

OTHER PUBLICATIONS

Office Action issued in related Korean Patent Application No. 10-2013-110286 mailed Dec. 22, 2014, 8 pages.

\* cited by examiner

*Primary Examiner* — Matthew Mikels
(74) *Attorney, Agent, or Firm* — Baker Botts L.L.P.

(57) ABSTRACT

An IC card of an embodiment performs contactless communication with an external device having a first battery and a first carrier wave output device to output carrier wave using electric power of the first battery. The IC card is provided with a second battery, a second carrier wave output device, a battery remaining capacity reading processor and a comparing processor. The second carrier wave output device outputs carrier wave using electric power of the second battery, to supply electric power to the external device. The battery remaining capacity reading processor acquires information indicating a remaining capacity of the first battery. The comparing processor compares the remaining capacity of the first battery with of a remaining capacity of the second battery.

8 Claims, 7 Drawing Sheets

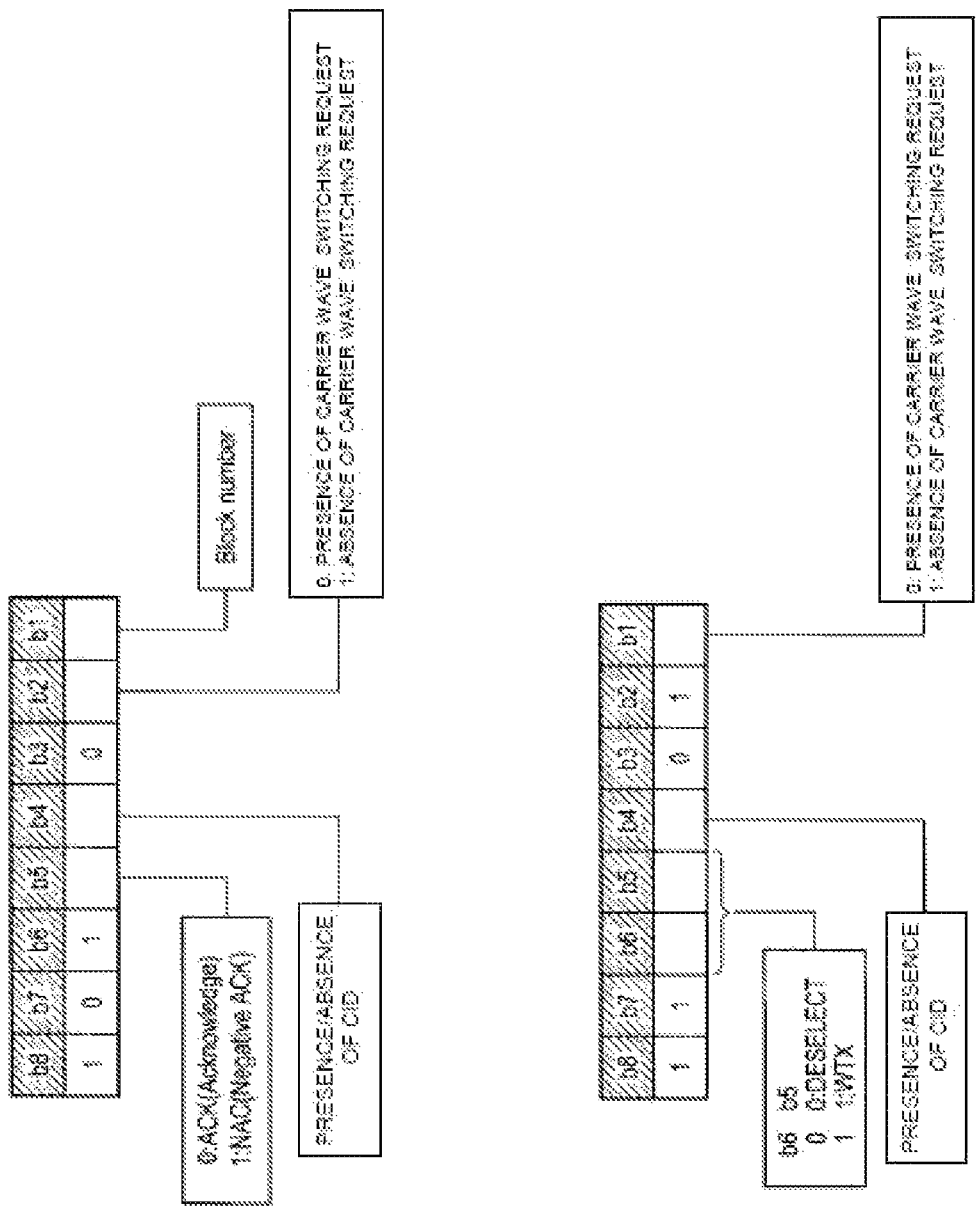

_IC CARD, PORTABLE ELECTRONIC DEVICE, AND READER/WRITER_

CROSS-REFERENCE TO RELATED APPLICATION

This application is based upon and claims the benefit of priority from the prior Japanese Patent Application No. 2012-207797,filed on Sep. 21, 2012,the entire contents of which are incorporated herein by reference.

FIELD

An embodiment of the present invention relates to an IC card, a portable electronic device, and a reader/writer.

BACKGROUND

Generally, an IC card used as a portable electronic device is provided with a card shaped main body formed of plastic or the like, and an IC module embedded in the main body. The IC module has an IC (Integrated Circuit) chip. The IC chip has a nonvolatile memory which can hold data in the state without power source, such as an EEPROM (Electrically Erasable Programmable Read-Only Memory) and a flash ROM (Read Only Memory), a CPU (Central Processing Unit) to execute various operations, and a RAM (Random Access Memory) used for the processing of the CPU, and so on.

An IC card can perform transmission of data and reception of data by contactless communication. The IC card to perform contactless communication is provided with an IC chip and an antenna. The IC card receives magnetic field outputted from a reader/writer of an IC card processing device which processes the IC card through the antenna within the IC card, and operates by electric power induced by electromagnetic induction. In addition, when the IC card receives a command from the IC card processing device by contactless communication, the IC card executes an application in accordance with the received command. By this means, the IC card can realize various functions.

Conventionally, an IC card processing device performs as an active mode which transmits a command to an IC card. In addition, the IC card performs as a passive mode which performs processing in accordance with the received command. But, recently, an IC card which performs as an active mode has been desired.

In order to perform contactless communication between IC cards themselves, it is necessary for either of the IC cards to output carrier wave. Because of this, there is an IC card provided with a battery. But when the remaining capacity of a battery becomes insufficient, it becomes impossible to perform communication between an active mode and a passive mode.

BRIEF DESCRIPTION OF THE DRAWINGS

FIG. 6 shows an example of a carrier wave switching request command of the R-block;

FIG. 7 shows an example of the carrier wave switching request command of the S-block;

DETAILED DESCRIPTION

According to an embodiment, an IC card, a portable electronic device, and a reader/writer which are provided with higher convenience are provided.

An IC card of an embodiment performs contactless communication with an external device having a first battery and a first carrier wave output device to output carrier wave using electric power of the first battery. The IC card is provided with a second battery, a second carrier wave output device, a battery remaining capacity reading processor and a comparing processor. The second carrier wave output device outputs carrier wave using electric power of the second battery, to supply electric power to the external device. The battery remaining capacity reading processor acquires information indicating a remaining capacity of the first battery. The comparing processor compares the remaining capacity of the first battery with of a remaining capacity of the second battery. According to the present embodiment, an IC card, a portable electronic device, and a reader/writer which are provided with higher convenience are provided.

Hereinafter, an IC card, a portable electronic device, and a reader/writer according to an embodiment will be described in detail with reference to the drawings.

Figure 1:
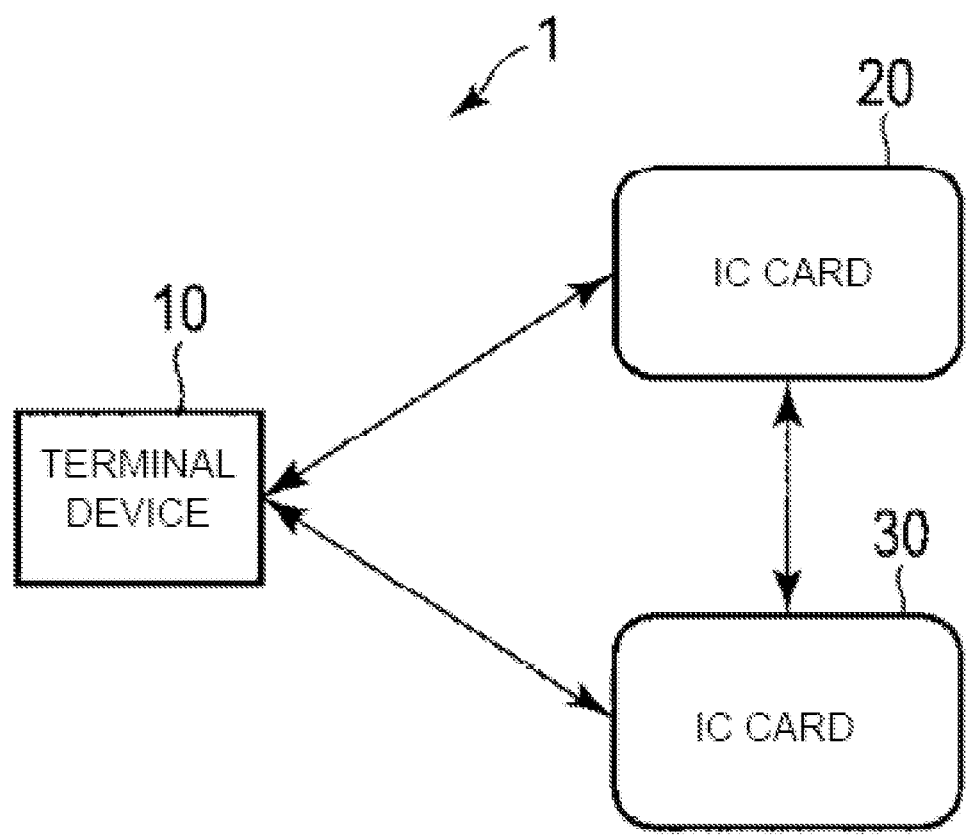
FIG. 1 is a diagram describing an IC card processing system according to an embodiment.

FIG. 1 shows a configuration example of an IC card processing system 1 according to the embodiment. The IC card processing system 1 is provided with a processing device (terminal device) 1 to process an IC card, an IC card 20, and an IC card 30 . . . Each of the IC card 20, the IC card 30 is a portable electronic device. The IC card 20, the IC card 30, and the terminal device 10 are each provided with a contactless communication function. By this means, the terminal device 10, the IC card 20, and the IC card 30 can perform transmission of data and reception of data with each other.

The terminal device 10 transmits a command to the IC card 20 or the IC card 30. Each of the IC card 20 and the IC card 30 performs processing in accordance with the command transmitted from the terminal device 10, and transmits a response to the terminal device 10. In this case, the terminal device 10 performs as an active mode, and each of the IC cards 20 and 30 performs as a passive mode.

In addition, each of the IC card 20 and the IC card 30 is also provided with a function of an active mode to transmit a command to other IC card, in the same manner as the terminal device 10. For example, it is assumed that the IC card 20 performs as an active mode, and the IC card 30 performs as a passive mode. In this case, the IC card 20 performs as a reader/writer of an IC card which transmits a command to the IC card 30, and receives a response from the IC card 30. The IC card 30 executes processing in accordance with the command transmitted from the IC card 20, and transmits a response to the IC card 20. The IC card 20 and the IC card 30 can communicate with other IC card in a contactless manner, and can make the other IC card execute command processing, in this manner.

In addition, the IC card 20 and the IC card 30 are provided with the similar configuration.

The terminal device 10 is provided with a resonator so as to communicate with the IC card 20 and the IC card 30. The resonator has an antenna having a prescribed resonance frequency, for example. The resonator generates magnetic field in accordance with data to be transmitted. By this means, the terminal device 10 can transmit data to the IC cards 20 and 30 existing within a communicable range in a contactless manner. In addition, the resonator outputs carrier wave in space. By this means, the terminal device 10 can supply electric power to the IC cards 20 and 30 in space.

In addition, the resonator detects magnetic field, and generates data in accordance with the detected magnetic field. By this means, the resonator can receive data in a contactless manner. By this means, the terminal device 10 can acquire the original data transmitted from the IC card 20 or 30.

Figure 2:
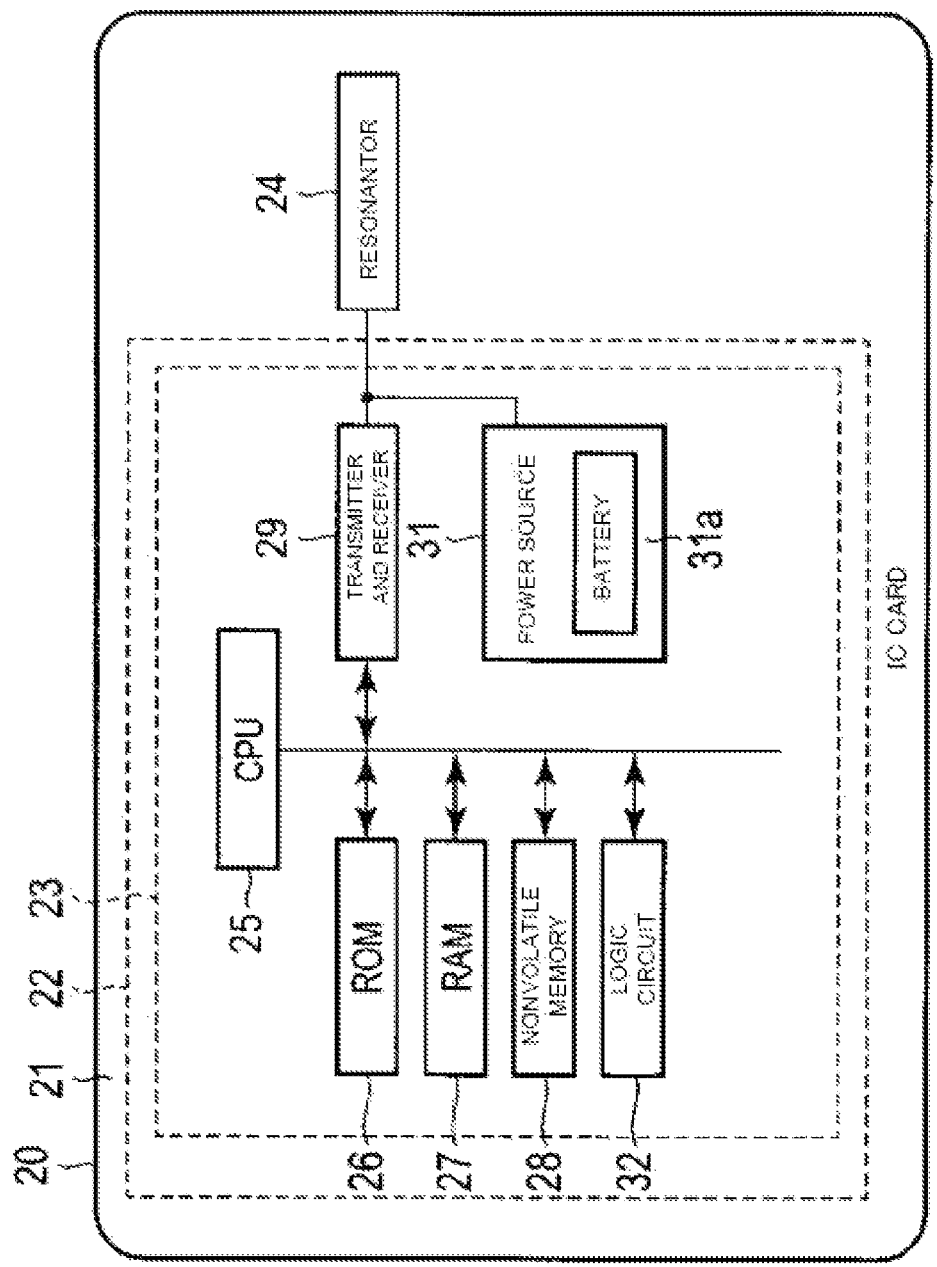
FIG. 2 is a diagram describing the IC card according to the embodiment.

FIG. 2 shows a configuration example of the IC card 20 according to the embodiment. The IC card 20 is provided with a rectangular main body 21, an IC module 22 and a resonator (antenna resonance circuit) 24 which are incorporated in the main body 21. The IC module 22 is provided with an IC chip 23. When the IC module 22 is installed in the main body 21, the resonator 24 installed in the main body 21 and the IC chip 23 of the IC module 22 are connected.

In addition, without being limited to a rectangular shape, the main body 21 may be of any shape in which at least the resonator 24 and the IC module 22 can be installed.

The IC chip 23 is provided with a CPU 25, a ROM 26, a RAM 27, a nonvolatile memory 28, a transmitter and receiver 29, a power source 31 and a logic circuit 32, and so on. The CPU 25, the ROM 26, the RAM 27, the nonvolatile memory 28, the transmitter and receiver 29, and the logic circuit 32 are connected to each other through a bus.

The resonator 24 is an interface for communicating with an external device, such as the terminal device 10, the IC card 30. The resonator 24 is provided with an antenna composed of a metal wire having a prescribed shape arranged in the IC module 22, for example.

IC card 20 makes the antenna generate magnetic field in accordance with the data to be transmitted to an external device. By this means, the IC card 20 can transmit data to the external device. In addition, the IC card 20 recognizes data transmitted from the external device based on an induced current generated in the antenna by electromagnetic induction. By this means, the IC card 20 can receive the data transmitted from the external device.

The CPU 25 performs as a controller to administer the whole control of the IC card 20. The CPU 25 performs various processings based on a control program and control data that are stored in the ROM 26 or the nonvolatile memory 28. For example, the CPU 25 executes various processings in accordance with the command received from the external device, and generates data as the processing result. In addition, the CPU 25 can generate a command which make the external device perform processing.

The ROM 26 is a nonvolatile memory to previously store a control program and control data and so on. The ROM 26 is incorporated in the IC chip 23 in a manufacturing stage, in the state in which the control program and the control data are stored. That is, the control program and the control data conforming to the specification of the IC card 20 are previously installed in the ROM 26.

The RAM 27 is a volatile memory which performs as a working memory. The RAM 27 temporarily stores data or the like which is being processed in the CPU 25. For example, the RAM 27 temporarily stores data received through the resonator 24. In addition, the RAM 27 temporarily stores data to be transmitted to the external device through the resonator 24. In addition, the RAM 27 further temporarily stores a program which the CPU 25 executes.

The nonvolatile memory 28 is provided with an EEPROM which can write and rewrite data, such as a flash memory. The nonvolatile memory 28 stores a control program, control data, an application, personal information, security information, and data used for the application. The security information is a cipher key, for example.

The transmitter and receiver 29 performs signal processing such as encoding, load modulation, to the data to be transmitted to the external device. For example, the transmitter and receiver 29 performs modulation (amplification) of the data to be transmitted to the external device. The transmitter and receiver 29 transmits the data after signal processing to the resonator 24.

In addition, the transmitter and receiver 29 performs demodulation and decoding to a signal received by the resonator 24. For example, the transmitter and receiver 29 analyzes the signal received by the resonator 24. By this means, the transmitter and receiver 29 acquires binary logic data. The transmitter and receiver 29 transmits the analyzed data to the CPU 25 thorough the bus.

The power source 31 generates electric power based on electric wave, especially carrier wave, outputted from the terminal device 10 or the IC card 30, or the like. That is, the power source 31 receives the carrier wave in space by the resonator 24, and can generate electric power by electromagnetic induction. In addition, the power source 31 generates an operation clock. The power source 31 supplies the generated electric power and the operation clock to the respective parts of the IC card 20. When having received the supply of the electric power, each of the parts of the IC card 20 becomes in an operable state.

In addition, the power source 31 is provided with a battery 31a. The battery 31a is provided with a battery to extract electric energy by chemical reaction or physical reaction of substances, for example. In addition, the battery 31a may be provided with a battery which stores the supplied electric power, that is a capacitor or a rechargeable battery. In the present specification, a capacitor is assumed as a battery which stores electric power.

For example, when the battery 31a is provided with a battery which stores electric power, that is a capacitor or a rechargeable battery, the power source 31 can generate electric power based on the carrier wave outputted in space, and can charge the generated electric power to the battery 31a. In addition, the power source 31 can supply the electric power which is charged in the battery 31a to the resonator 24. By this means, the IC card 20 can output the carrier wave from the resonator 24 into space using the electric power charged in the battery 31a. By this means, the IC card 20 can supply electric power to other IC card in space (the IC card 30, for example). That is, the IC card 20 has a carrier wave output device 41 (described later) to output carrier wave using the electric power of the battery 31a.

In addition, the power source 31 can further detect the capacity of electric power charged in the battery 31a. The power source 31 can supply information indicating the capacity of electric power charged in the battery 31a to the CPU 25.

The logic circuit 32 is a calculator to perform calculation processing by means of hardware. For example, the logic circuit 32 performs processing, such as encoding, decoding and generation of random number, based on a command from an external device. For example, when the IC card 20 receives a mutual authentication command, the logic circuit 32 generates the random number, and transmits the generated random number to the CPU 25.

The CPU 25, when oneself is a passive mode, can execute processing (command processing) corresponding to a command received by the transmitter and receiver 29. According to the command received by the transmitter and receiver 29, for example, the CPU 25 can execute processing in accordance with various commands prescribed by ISO/IEC7816, such as reading data and writing data.

In addition, the CPU 25, when oneself is an active mode, can transmit a command to the terminal device 10, or the other IC card 30 by the transmitter and receiver 29. In addition, the CPU 25 analyzes a response transmitted from the terminal device 10, or the other IC card 30 and can recognize the processing result in the terminal device 10 or the other IC card 30.

Figure 9:
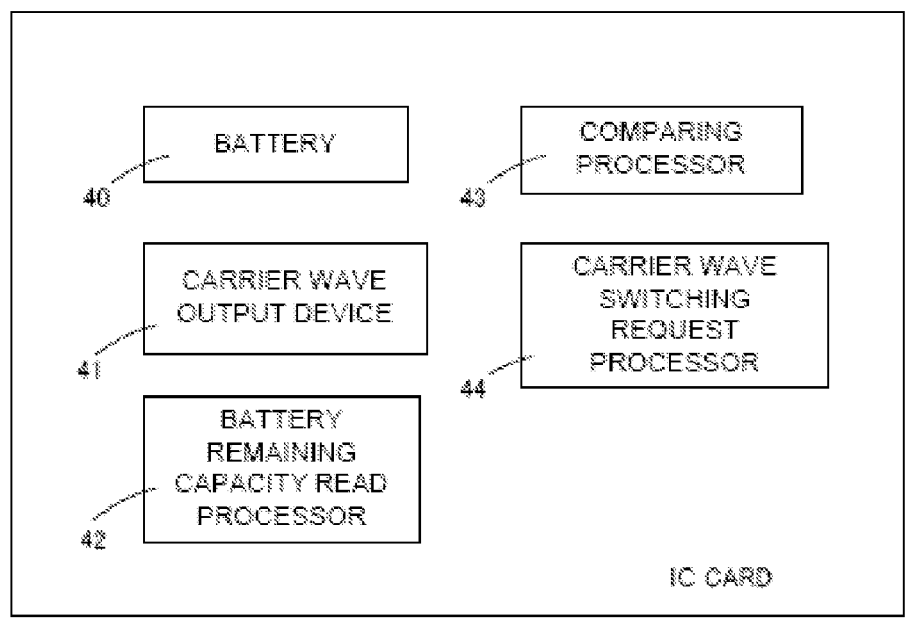
FIG. 9 is a diagram describing a functional configuration of the IC card according to the embodiment.

As shown in FIG. 9, each of the IC card 20 and the IC card 30 has, as a functional configuration, a battery 40, the carrier wave output device 41, a battery remaining capacity reading processor 42, a comparing processor 43, a carrier wave switching request processor 44. The carrier wave output device 41 outputs carrier wave using the electric power of the battery 40, and supplies electric power to an external device. The battery remaining capacity reading processor 42 acquires information indicating a remaining capacity of a battery of the external device. The comparing processor 43 compares the remaining capacity of the battery of the external device with the remaining capacity of the own battery. The carrier wave switching request processor 44 requests switching of the output of the carrier wave to the external device, based on the comparison result by the comparison processor 43.

The IC card 20 is issued through a primary issue and a secondary issue. In the primary issue, the IC card 20 creates files for storing various data in the nonvolatile memory 28 in accordance with commands. By this means, a Master File (MF), a Dedicated File (DF), and an Elementary File (EF) and so on are created in the nonvolatile memory 28.

The MF is a file which constitutes a core of the file structure. The DF is created at a lower level of the MF in a hierarchy structure. The DF is a file to store applets and components which the applets have, and so on, by grouping them. The EF is created at a lower level of the DF. The EF is a file for storing various data. In addition, there is also a case in which the EF is positioned immediately below the MF.

There are kinds such as a Working Elementary File (WEF) and an Internal Elementary File (IEF) in the EF. The WEF is a working EF, and stores personal information and so on. The IEF is an internal EF, and stores data such as, a cipher key (personal identification number) and so on, for security.

In the secondary issue, individual data such as customer data is stored in the EF, for example. By this means, the IC card 20 becomes in an operable state. The CPU 25 executes the program stored in the nonvolatile memory 28 or the ROM 26, and thereby can realize various processings.

In addition, the IC card 30 has the same configuration as the IC card 20, as described above. For this reason, each of the IC card 20 and the IC card 30 can charge the battery by the carrier wave supplied from the terminal device 10.

Furthermore, when performing as an active mode, either of the IC card 20 or the IC card 30 can make other IC card execute command processing. Here, an example in which the IC card 20 is an active mode, and the IC card 30 is a passive mode will be described. In addition, an example in which the IC card 20 outputs carrier wave will be firstly described.

The IC card 20 that is the active mode transmits an initial response request command and a selection command and so on (generally, referred to as an initial setting command) to the IC card 30, to thereby perform various settings regarding communication to the IC card 30.

The IC card 20 generates an initial response request command so as to detect the IC card 30. The initial response request command has a parameter indicating that the command is an initial response request command, a parameter for specifying the application field, a parameter indicating attribute information such as the kind of the command and a method of anticollision, a parameter indicating the number of slots of the anticollision, and a cyclic redundancy check code, for example.

The IC card 20 repeatedly transmits the generated initial response request command to a communicable range in space by the resonator 24. In addition, the IC card 20 supplies carrier wave to the communicable range.

When the IC card 30 enters into the communicable range of the IC card 20, the IC card 30 is activated by the carrier wave from the IC card 20, and becomes in an idle state. That is, the IC card 20 supplies the carrier wave to the IC card 30 within the communicable range. In addition, the IC card 30 receives the initial response request command.

The IC card 30 analyzes the received initial response request command. By this means, the IC card 30 recognizes the values of various parameters of the initial response request command. The IC card 30 executes the processing based on the values of the recognized parameters. The IC card 30 generates an initial response to the initial response request command in accordance with the processing result.

The initial response includes a parameter indicating that the response is a response to the initial response request command, a pseudo peculiar IC card (PICC) identifier, application data, protocol information, and a cyclic redundancy check code. The application data indicates what applications are written in the IC card 30. The protocol information indicates the protocol which the IC card 30 supports.

Having received the initial response request command, for example, the IC card 30 generates an initial response including the information as described above. In addition, the protocol information includes information (communication speed information) indicating communication speed which the IC card 30 supports. Furthermore, the protocol information includes the communication speed information, a maximum frame length, a protocol type, a frame waiting time coefficient, application data encoding and a frame option, and so on.

The maximum frame length indicates a maximum frame length which the IC card 30 can receive. The protocol type indicates a protocol type which the IC card 30 supports. The frame waiting time coefficient indicates a maximum time from the last of the command (a frame including the command) transmitted from the IC card 20 to a time when the IC card 30 starts the response. The application data encoding indicates a type of the encoding which the IC card 30 supports. The frame option indicates whether the IC card 30 supports a node address (NAD) or supports a card identifier (CID).

The IC card 30 transmits the generated initial response to the initial response request command to the IC card 20.

Having received the initial response to the initial response request command, the IC card 20 analyzes the received response. By this means, the IC card 20 recognizes that the IC card 30 exists in the own communicable range.

In addition, the IC card 20 confirms the communication speed information included in the initial response, and recognizes the communication speed which is supported by the IC card 30. In addition, the IC card 20 generates a selection command having information indicating a communication speed which is set by the IC card 30, and identification information for identifying the IC card 30. The identification information is a card identifier (CID), for example. The IC card 20 transmits the selection command to the IC card 30.

Having received the selection command, the IC card 30 analyzes the selection command. By this means, the IC card 30 recognizes the communication speed and the identification information which are designated by the IC card 20 and included in the selection command.

The IC card 30 compares the recognized identification information and the identification information which oneself has, and when they coincide with each other, the IC card 30 performs the subsequent processing. In this case, the IC card 30 sets the communication speed designated by the selection command to oneself. Specifically, the IC card 30 stores communication speed setting information indicating the communication speed designated by the selection command in a prescribed memory area on the RAM 27, or the nonvolatile memory 28, to thereby set the communication speed. The IC card 30 performs the reception of the command and the transmission of the response in accordance with the communication speed indicated by the communication speed setting information stored in the RAM 27, or the nonvolatile memory 28.

In addition, the IC card 30 finishes the processing, when the acquired identification information does not coincide with the identification information which oneself has.

When the setting of the communication speed has been finished, the IC card 30 generates a response to the selection command, and transmits the generated response to the IC card 20. In addition, in this case, the IC card 30 transmits the response in a state in which the IC card 20 can analyze at a standard communication speed to the IC card 20. After transmitting the response to the selection command, the IC card 30 receives a new command, analyzes the command, and transmits a response to the command, in accordance with the communication speed set by the above-described processing.

When the IC card 20 receives the response to the selection command, the IC card 20 analyzes the response, to thereby recognize that the selection of the IC card 30 has normally been completed. After this, the IC card 20 transmits the command at the communication speed set in the IC card 30, and receives the response.

By the above-described processing, a communication channel is established between the IC card 20 and the IC card 30. After this, the IC card 30 can execute various command processings based on a command transmitted from the IC card 20.

The IC card 20 transmits a command for making the IC card 30 execute the processing to the IC card 30. Having received the command, the IC card 30 analyzes the received command. The IC card 30 executes the command processing based on the analyzed command, and generates a response. The IC card 30 transmits the generated response to the IC card 20.

In addition, the IC card 20 and the IC card 30 perform command/response by transmitting and receiving a frame of a prescribed format.

In addition, in the present embodiment, the IC card 20 and the IC card 30 performs contactless communication with each other by the block format prescribed by ISO/IEC14443. The IC card 20 and the IC card 30 transmit and receive a command and a response, to thereby perform initial setting. By this means, communication protocol between the IC card 20 and the IC card 30 is activated. As a result, the IC card 30 can execute various processings in accordance with the command transmitted from the IC card 20.

The IC card 20 and the IC card 30 transmit and receive data of a frame in accordance with the communication format prescribed by ISO/IEC14443. For example, in ISO/IEC14443, as a frame format, block transmission systems, such as an I-block (Information block), an R-block (Receive ready block), an S-block (Supervisory block) are prescribed.

The I-block, R-block, and S-block have different roles, respectively. The I-block (I block) is a format for transmitting information used in an application layer. The I-block is used for usual reading data and writing data.

The R-block (R block) is a format for transmitting an acknowledgement or a negative acknowledgement. There are kinds such as an R-block (ACK) and an R-block (NAC) in the R-block. The R-block (ACK) is used when a next command is requested. In addition, the R-block (NAK) is used when retransmission of the received command is requested.

The S-block (S block) is a format so as to exchange control information between the IC card 20 and the IC card 30. The S-block is used as an extension request of a processing time, an instruction (Deselect) to make an IC card to be deactivated.

Figures 4, 5:
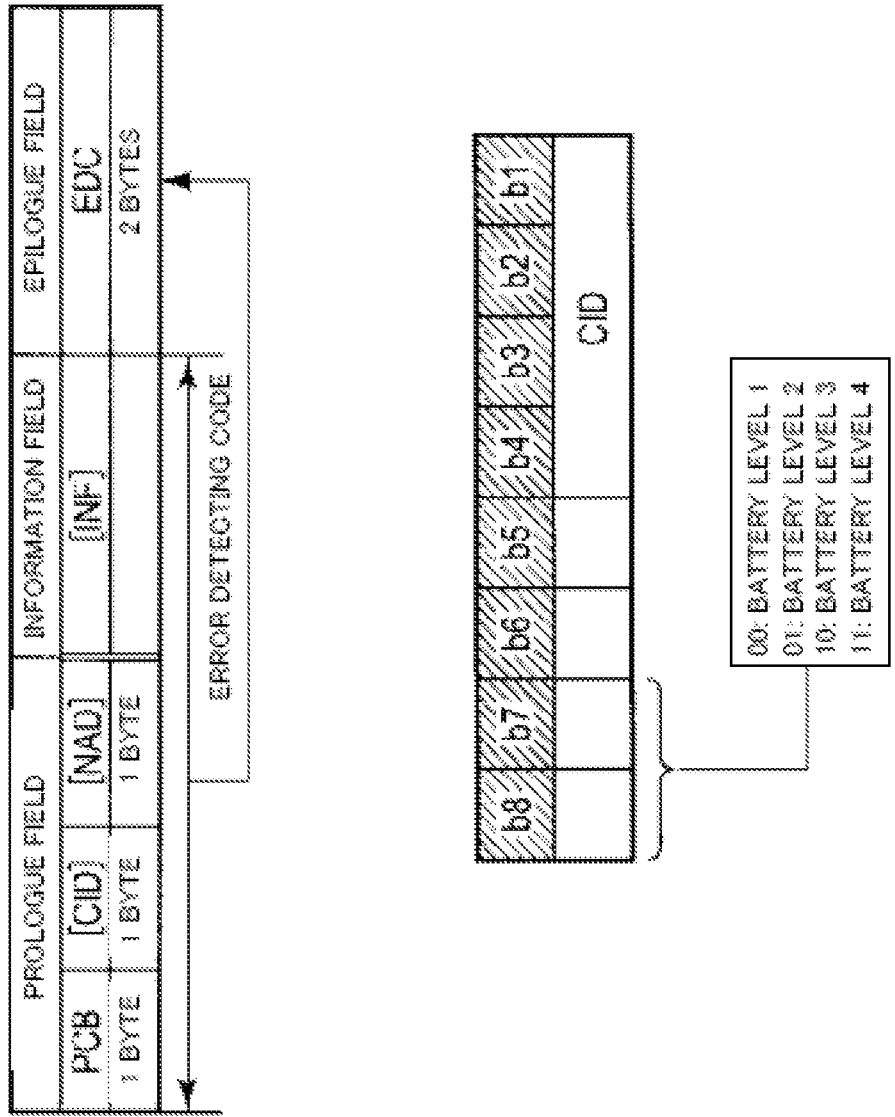
FIG. 4 shows an example of a block format.
FIG. 5 shows an example of a part of a response of the I-block to a battery remaining capacity read command.

FIG. 4 shows an example of a block format. A frame conforming to the block format prescribed by ISO/IEC14443 has fields such as a prologue field, an information field, and an epilogue field, and so on. All of the I-block, the R-block, and the S-block conform to the block format shown in FIG. 4.

The prologue field has data such as a Protocol Control Byte (PCB), a Card IDentifier (CID), and a Node Address (NAD).

The PCB that is a protocol control byte can transmit information necessary for data transmission control to a device of the other party (external device). For example, the PCB has information indicating that this frame is the I-block, the R-block, or the S-block.

The CID that is a card identifier is data so as to designate an IC card to be processed. Each of the IC card 20 and the IC card 30 stores a peculiar CID thereof in the ROM 26 or the nonvolatile memory 28. The IC card 20 that is an active mode acquires the CID from the IC card 30 in the initial setting. The IC card 20 sets the CID of the IC card 30 to be processed to the CID of the prologue field.

When the IC card 30 receives a command, and when the value of the CID of the prologue field coincides with the value of the own CID, the IC card 30 executes the processing corresponding to the received command. The NAD that is a node address is data for constructing different logical connection.

The information field is provided with Information (INF) having a data body of a command, application data, or status information, for example. The IC card 30 executes various processings in accordance with the data stored in the information field. In addition, the information field may be omitted.

The epilogue field is provided with an error detecting code, such as a CRC (Cyclic Redundancy Code) so that the IC card 30 at a receiving side can detect a communication error. The error detecting code is a value which is calculated based on the data of the epilogue field and the information field. The device at a passive mode can detect a communication error based on the data in the epilogue field and the information field, and the error detecting code.

After having established the communication channel with the IC card 30, the IC card 20 that is the active mode generates a command for making the IC card 30 execute the processing, and transmits the command to the IC card 30. In addition, the IC card 20 transmits the command of the I-block to the IC card 30.

Having received the command, the IC card 30 analyzes the received command. The IC card 30 executes the command processing based on the analyzed command, and generates a response. The IC card 30 transmits the generated response to the IC card 20. In addition, the IC card 30 transmits the response of the I-block to the IC card 20.

As described above, in the present embodiment, firstly the IC card 20 supplies the carrier wave to the IC card 30. But when the remaining capacity of the battery of the carrier wave supplying side becomes deficient, there is a possibility of communication interruption. Accordingly, the IC card 20 requests switching of the carrier wave under a prescribed condition to the IC card 30 that is the other party.

Figure 3:
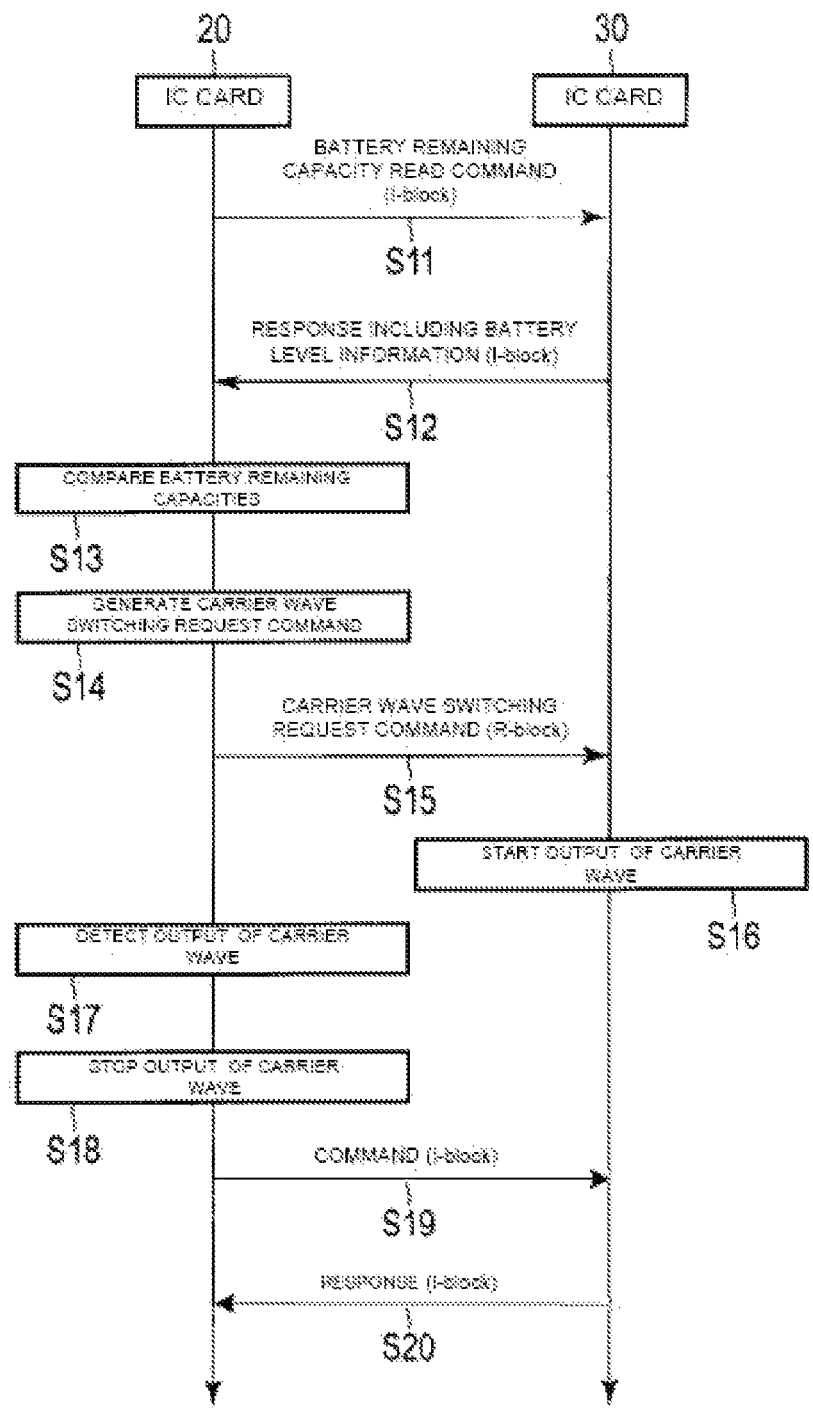
FIG. 3 is a diagram describing an example of a processing about a carrier wave switching.

FIG. 3 shows an example of a processing of the IC card 20 and the IC card 30 relating to switching of the carrier wave. As shown in FIG. 3, the IC card 20 transmits a battery remaining capacity read command to the IC card 30 (step S11). The battery remaining capacity read command is a command to request detection of the battery remaining capacity of the IC card 30 of the other party and return of information in accordance with the detected value.

When the IC card 30 receives the battery remaining capacity read command, the IC card 30 detects a remaining capacity of the own battery 31$a$. In addition, the IC card 30 generates information indicating the detected remaining capacity of the battery 31$a$. The IC card 30 detects a remaining capacity of the battery 31$a$ by four levels of "a battery level 1", "a battery level 2", "a battery level 3",and "a battery level 4",and generates information indicating the battery level. The IC card 30 adds the information indicating the battery level (battery level information) to the response, and transmits the response to the IC card 20 (step S12). That is, the IC card 20 has the battery remaining capacity reading processor 42.

FIG. 5 shows an example of a part of a response of the I-block to a battery remaining capacity read command. FIG. 5 shows an example of the structure of the CID of the response of the I-block. In addition, the I-block conforms to the block format shown in FIG. 4.

The CID of the response to the battery remaining capacity read command is data of one byte, and has a first bit b1 to an eighth bit b8. The first bit b1 to the fourth bit b4 indicate identification information of the IC card 30.

The seventh bit b7 and the eighth bit b8 are the battery level information. When the seventh bit b7 and the eighth bit b8 are "00," it is indicated that the battery level is "the battery level 1." When the seventh bit b7 and the eighth bit b8 are "01," it is indicated that the battery level is "the battery level 2." When the seventh bit b7 and the eighth bit b8 are "10," it is indicated that the battery level is "the battery level 3.," When the seventh bit b7 and the eighth bit b8 are "11," it is indicated that the battery level is "the battery level 4."

The IC card 30 sets the values of the seventh bit b7 and the eighth bit b8 in accordance with the detected battery level.

When the IC card 20 receives the response to the battery remaining capacity read command transmitted from the IC card 30, the IC card 20 analyzes the received response. By this means, the IC card 20 can recognize the battery level of the IC card 30. Furthermore, the IC card 20 detects a battery level of the own battery 31$a$. That is, the IC card 20 detects a remaining capacity of the own battery 31$a$. In addition, the battery level of the IC card 20 is written as BAT1, and the battery level of the IC card 30 is written as BAT2.

The IC card 20 compares the own battery level BAT1 with the battery level BAT2 of the IC card 30 (step S13). By this means, the IC card 20 judges which of the own battery level BAT1 and the battery level BAT2 of the IC card 30 is larger. In addition, when the IC card 20 judges that the battery level BAT2 of the IC card 30 is larger than the own battery level BAT1, the IC card 20 requests switching of the carrier wave to the IC card 30. That is, the IC card 20 has the comparing processor 43 which compares the remaining capacity of the battery of the IC card 20 with the remaining capacity of the battery of the IC card 30.

In this case, the IC card 20 generates a carrier wave switching request command to request outputting the carrier wave to the IC card 30 (step S14). The IC card 20 transmits the generated carrier wave switching request command to the IC card 30 (step S15). That is, the IC card 20 has the carrier wave switching request processor 44.

For example, the IC card 20 transmits the battery remaining capacity read command to the IC card 30 at a prescribed time interval. By this means, the IC card 20 can compare the own battery remaining capacity with the battery remaining capacity of the other party at a prescribed time interval.

In addition, the IC card 20 transmits a carrier wave switching request command in either block format of the I-block, the R-block or the S-block to the IC card 30.

Hereinafter, the carrier wave switching request command will be described. The frame of the I-block is provided with a prologue field, an information field and an epilogue field. The carrier wave switching request command of the I-block is added to the information field of a command of a normal format. That is, in this case, it is indicated that the command is a carrier wave switching request command by a class byte (CLA) and an instruction byte (INS) of the command added to the information field.

FIG. 6 shows an example of a carrier wave switching request command of the R-block. For example, the IC card 20 generates a carrier wave switching request command with the R-block format. In addition, the frame of the R-block is provided with a prologue field, and an epilogue field, and is not provided with an information field.

A PCB of the carrier wave switching request command of the R-block shown in FIG. 6 is data of one byte, and has a first bit b1 to an eighth bit b8. The first bit b1 indicates a block number of this command.

The second bit b2 indicates the presence or absence of the carrier wave switching request. That is, the second bit b2 indicates whether or not the frame including this PCB is the carrier wave switching request command. In the present example, when the second bit b2 is "0," it is indicated that the frame including this PCB is the carrier wave switching request command. In addition, when the second bit b2 is "1," it is indicated that the frame including this PCB is not the carrier wave switching request command. In addition, "0" and "1" of the second bit b2 may be allotted inversely.

The third bit b3 is a specified value. The fourth bit b4 indicates the presence or absence of the CID. The fifth bit b5 indicates whether the frame including this PCB is the R-block (ACK) or the R-block (NAC). The sixth bit b6 is a specified value.

The seventh bit b7 and the eighth bit b8 indicate that the frame including this PCB is the R-block, the I-block, or the S-block. For example, when the eight bit b8 is "1," and the seventh bit b7 is "0," it is indicated that the frame including this PCB is the R-block.

That is, the IC card 20 respectively sets the eight bit b8 of the PCB to "1," the seventh bit b7 to "0," the fifth bit b5 to "0," the second bit b2 to "0," to thereby generate a carrier wave switching request command of the R-block.

FIG. 7 shows an example of the carrier wave switching request command of the S-block. In addition, the frame of the S-block is provided with a prologue field, an information field, and an epilogue field.

A PCB of the carrier wave switching request command of the S-block shown in FIG. 7 is data of one byte, and has a first bit b1 to an eighth bit b8.

The first bit b1 indicates the presence or absence of the carrier wave switching request. That is, the first bit b1 indicates whether or not the frame including this PCB is the carrier wave switching request command. In the present example, when the first bit b1 is "1," it is indicated that the frame including this PCB is the carrier wave switching request command. In addition, when the first bit b1 is "0," it is indicated that the frame including this PCB is not the carrier wave switching request command. In addition, "0" and "1" of the first bit b1 may be allotted inversely.

The second bit b2 and the third bit b3 are specified values. The fourth bit b4 indicates the presence or absence of the CID. The fifth bit b5 and the sixth bit b6 indicate whether this command is the WTX (Waiting Time eXtension: waiting time extension instruction), or the instruction (Deselect) which deactivates the IC card 20.

The seventh bit b7 and the eighth bit b7 indicate that the frame including this PCB is the I-block, the R-block or the S-block. For example, when the eighth bit b8 is "1," and the seventh bit b7 is "1," it is indicated that the frame including this PCB is the S-block.

That is, when the IC card 20 instructs switching of the carrier wave to the IC card 30, the IC card 20 sets the eighth bit b8 of the PCB to "1," sets the seventh bit b7 to "1," and sets the first bit b1 to "1." The IC card 20 transmits the carrier wave switching request command which has been set in this manner to the IC card 30 by the step S15.

Having received the command, the IC card 30 analyzes the received command. By this means, the IC card 30 recognizes that the received command is the carrier wave switching request command. Having received the carrier wave switching request command, the IC card 30 starts outputting the carrier wave (step S16).

The IC card 30 detects the change in magnetic field, to thereby recognize that the carrier wave has been outputted from the IC card 30 (step S17). Furthermore, the IC card 20 stops outputting the carrier wave (step S18). In this case, the IC card 20 generates electric power by the carrier wave outputted from the IC card 30, and operates.

For example, the IC card 20 generates a command of the I-block, and transmits the command to the IC card 30 (step S19). The IC card 30 executes command processing in accordance with the command received from the IC card 20. The IC card 30 transmits a response in accordance with the result of the command processing to the IC card 20 (step S20).

In addition, after this, the IC card 20 transmits a battery remaining capacity read command to the IC card 30 at a prescribed timing, and thereby can compare the battery remaining capacities between the IC card 20 and the IC card 30. In addition, when the battery level of the IC card 30 which is outputting the carrier wave is lower than that of the IC card 20, the IC card 20 transmits again a carrier wave switching request command to the IC card 30. Furthermore, the IC card 20 starts outputting the carrier wave.

When the IC card 30 receives the carrier wave switching request command while the IC card 30 is outputting the carrier wave, the IC card 30 stops outputting the carrier wave.

Figure 8:
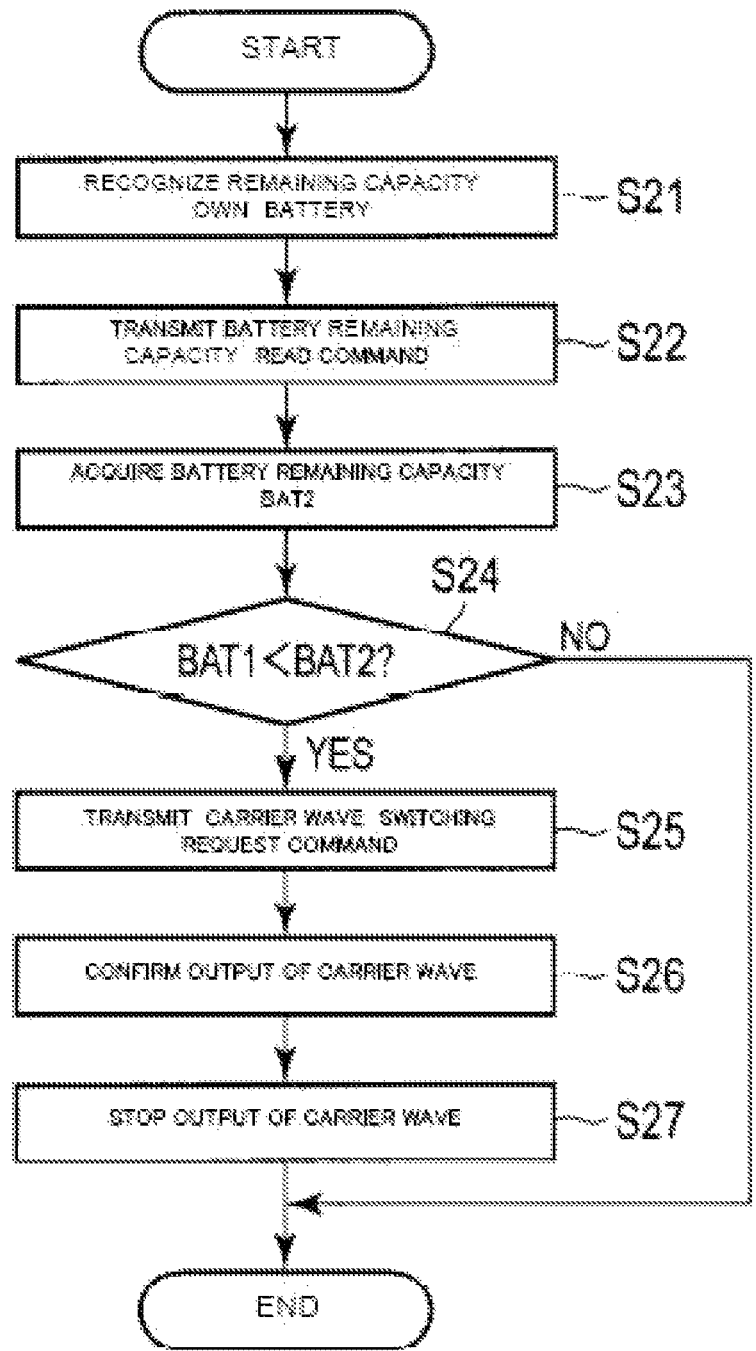
FIG. 8 shows an example of a processing of the IC card 20 that is the active mode.

FIG. 8 shows an example of a processing of the IC card 20 that is the active mode. The IC card 20 detects a battery level BAT1 of the own battery 31a (step S21). The IC card 20 transmits a battery remaining capacity read command to the IC card 30 (step S22). Furthermore, the IC card 20 receives a response to the battery remaining capacity read command from the IC card 30.

Having received the response to the battery remaining capacity read command transmitted from the IC card 30, the IC card 20 analyzes the received response. By this means, the IC card 20 recognizes the battery level BAT2 of the IC card 30 (step S23).

The IC card 20 compares the own battery level BAT1 with the battery level BAT2 of the IC card 30 (step S24). Judging that the battery level BAT2 of the IC card 30 is larger than the own battery level BAT1, the IC card 20 transmits a carrier wave switching request command to the IC card 30 (step S25).

Furthermore, the IC card 20 sequentially detects the output of the carrier wave from the IC card 30 (step S26). Having detected that the carrier wave has been outputted from the IC card 30, the IC card 20 stops outputting the carrier wave (step S27).

By the above-described processing, the IC card 20 and the IC card 30 can switch the output source of the carrier wave to each other in accordance with the respective battery levels. By this means, it is possible to avoid communication interruption due to shortage of the battery remaining capacity of either of a pair of IC cards to perform communication.

In addition, the IC card may be provided with the configuration to designate the output level of the carrier wave, in accordance with the difference between the BAT1 and the BAT2. By this means, it is possible to indicate an output side of the carrier wave so as to output the carrier wave at a minimum level. As a result, it is possible to reduce the consumption of the battery of the IC card at the output side of the carrier wave.

In addition, since an IC card operates as an active mode, the IC card operating as the active mode operates as a reader/writer of an IC card.

As a result, according to the embodiment, it is possible to provide an IC card, a portable electronic device, and a reader/writer which are provided with higher convenience.

In addition, it has been described that the above-described IC card has the configuration in which the active mode performs the comparison between the BAT1 and the BAT2, but the configuration of the IC card is not limited to this configuration. The configuration in which an IC card of a passive mode performs the comparison between the BAT1 and the BAT2 may be used.

It is assumed that the IC card 20 is an active mode, and the IC card 30 is a passive mode, for example. In this case, the IC card 20 transmits a command including the level BAT1 of the battery of the IC card 20 to the IC card 30.

The IC card 30 can recognize the battery level BAT1 of the IC card 20 from the received command. The IC card 30 compares the own battery level BAT2 with the recognized battery level BAT1. When BAT1<BAT2, and the IC card 20 is outputting the carrier wave, or when BAT2<BAT1, and the IC card 30 is outputting the carrier wave, the IC card 30 transmits a response indicating that switching of the carrier wave is necessary to the IC card 20.

Having received the response indicating that switching of the carrier wave is necessary, the IC card 20 transmits a carrier wave switching request command to the IC card 30. With this configuration, the IC card 20 and the IC card 30 can switch the output source of the carrier wave to each other in accordance with the respective battery levels.

In addition, without being limited to that the functions described in each of the above-described embodiments are configured using hardware, the respective functions can be realized using software. That is, the respective functions can be realized by making a computer read program describing the respective functions. In addition, each of the functions may be configured by arbitrarily selecting either of software and hardware.

While a certain embodiment has been described, this embodiment has been presented by way of example only, and is not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. In an IC card which performs contactless communication with an external device, the external device having a first battery and a first carrier wave output device to output carrier wave using electric power of the first battery, the IC card, comprising:
   a second battery;
   a second carrier wave output device which outputs carrier wave using electric power of the second battery, to supply electric power to the external device;
   a battery remaining capacity reading processor to acquire information indicating a remaining capacity of the first battery from the external device;
   a comparing processor to compare the remaining capacity of the first battery with a remaining capacity of the second battery; and
   a carrier wave switching request processor which requests switching of the output of the carrier wave to the external device so that the first carrier wave output device outputs the carrier wave, when the second carrier wave output device outputs the carrier wave and the remaining capacity of the first battery is larger than the remaining capacity of the second battery.

2. The IC card according to claim 1, further comprising a resonator which transmits commands to the external device for execution by the external device.

3. The IC card according to claim 1, further comprising a resonator which transmits a switching request signal from the switching request signal processor to the external device when the remaining capacity of the first battery is larger than the remaining capacity of the second battery to initiate switching of the output of the carrier wave to the external device.

4. The IC card according to claim 1, comprising:
   an IC module having the second battery, the second carrier wave output device, the battery remaining capacity reading processor and the comparing processor; and
   a main body in which the IC module is arranged.

5. The IC card according to claim 1, wherein the second battery is a rechargeable battery.

6. The IC card according to claim 1, wherein the second battery is charged by the carrier wave from the external device.

7. In a portable electronic device which performs contactless communication with an external device, the external device having a first battery, and a first carrier wave output device to output carrier wave using electric power of the first battery, the portable electronic device, comprising:
   a second battery;
   a second carrier wave output device which outputs carrier wave using electric power of the second battery, to supply electric power to the external device;
   a battery remaining capacity reading processor to acquire information indicating a remaining capacity of the first battery from the external device;
   a comparing processor to compare the remaining capacity of the first battery with a remaining capacity of the second battery; and
   a carrier wave switching request processor to request switching of the output of the carrier wave to the external device so that the first carrier wave output device outputs the carrier wave, when the second carrier wave output device outputs the carrier wave and the remaining capacity of the first battery is larger than the remaining capacity of the second battery.

8. In a reader/writer which performs contactless communication with an external device, the external device having a first battery, and a first carrier wave output device to output carrier wave using electric power of the first battery, the reader/writer, comprising:
   a second battery;
   a second carrier wave output device which outputs carrier wave using electric power of the second battery, to supply electric power to the external device;
   a battery remaining capacity reading processor to acquire information indicating a remaining capacity of the first battery from the external device;
   a comparing processor to compare the remaining capacity of the first battery with a remaining capacity of the second battery; and
   carrier wave switching request processor to request switching of the output of the carrier wave to the external device so that the first carrier wave output device outputs the carrier wave, when the second carrier wave output device outputs the carrier wave and the remaining capacity of the first battery is larger than the remaining capacity of the second battery.

* * * * *